Patented July 22, 1941

2,250,408

UNITED STATES PATENT OFFICE 2,250,408

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application June 27, 1940, Serial No. 342,731

6 Claims. (Cl. 252—344)

This invention relates primarily to the treatment of emulsions of mineral oil and water, such as petroleum emulsions, for the purpose of separating the oil from the water.

One object of my invention is to provide a novel process for resolving petroleum emulsions of the water-in-oil type, that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The demulsifier or demulsifying agent employed in my process consists of a compound or mixture of compounds that comprises the acylation product derived by reaction between a high molecular weight carboxy acid or its equivalent, and an azolidine. The word "azolidine" is commonly used to designate a class of heterocyclic materials characterized by the following heterocyclic nucleus:

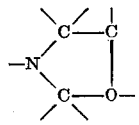

The azolidines are well known compounds. For example, see German Patent 564,787, dated February 17, 1931, to I. G. Farbenind. A.-G. Among the azolidines therein described are the following:

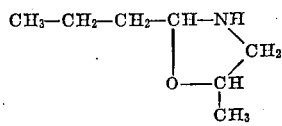

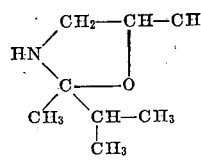

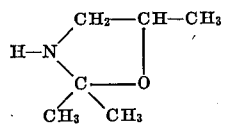

It is also known that similar reactions are possible involving the use of reactants so as to introduce a hydroxyl radical into the azolidine, as for example, by employment of diacetone alcohol, i. e., a hydroxy ketone instead of an ordinary ketone; or by the employment of a dihydroxy propylamine instead of a monohydroxy propylamine; or by means of other suitable reactions. The formation of such compounds can be indicated by comparing the reaction with the one involved in the formation of the azolidine derived from propanolamine and methyl isopropyl ketone. This may be indicated in the following ways:

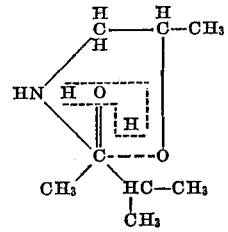

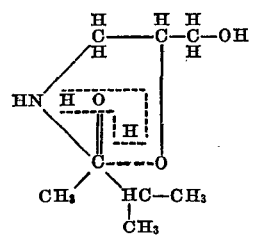

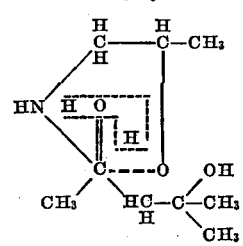

Furthermore, the axolidines may be treated with an oxyalkylating agent, such as ethylene oxide, propylene oxide, butylene oxide, or the equivalent, such as glycid, epichlorhydrin, or the like, and by such procedure, the amino hydrogen atom may be converted into an alkylol group.

Thus by the action of ethylene oxide, one may obtain an azolidine of the following type:

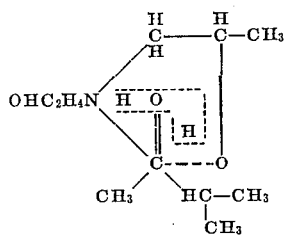

Another suitable procedure for producing an azolidine containing a reactive hydrogen atom, i. e., an azolidine of the kind susceptible to acylation, involves diethanolamine and formaldehyde or the equivalent reactants. Such reaction may be shown in the following manner:

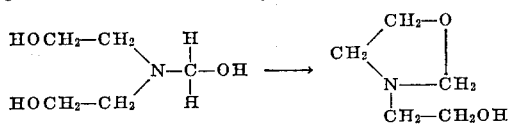

The initial reaction between formaldehyde and the secondary amine produces a pseudo-basic carbinol which, on heating, forms the azolidine. See Journal of the American Chemical Society, Volume 61, No. 11, 3134–3139, and particularly the articles referred to in the footnotes of this particular article.

As to a type of reaction which illustrates the formation of the pseudo-basic carbinol from a secondary amine and aldehyde, see the following U. S. Patents: 1,071,007, to Merling et al., dated Aug. 19, 1913; 1,071,008, to Merling et al., dated Aug. 19, 1913.

Having obtained the azolidine characterized by the presence of at least one reactive hydrogen atom, i. e., a hydrogen atom connected to an oxygen atom or to a nitrogen atom or to both, one acylates such compound in the conventional manner by reaction with a high molecular weight carboxy acid or its equivalent, such as the anhydride, ester, amide, acyl chloride, or the like. In all respects the acylation reaction is comparable to the acylation of morpholine or ethanol morpholine. If an amino hydrogen atom is replaced by an acyl radical, one obtains an amide type derivative; whereas if a hydroxyl hydrogen atom is replaced, one obtains an ester. If both types are replaced by an acyl radical, one obtains an esteramide type. One could, of course, replace one reactive hydrogen by an acyl radical derived from a lower molecular weight carboxy acid having six carbon atoms or less, such as acetic acid, butyric acid, or the like; but such compound after acylation with such lower molecular weight carboxy acid must still have present at least one reactive hydrogen atom so that one can still acylate and introduce an acyl radical derived from a higher molecular weight carboxy acid.

The expression "higher molecular weight carboxy acids" is an expression frequently employed to refer to certain organic acids, particularly monocarboxy acids, having more than six carbon atoms, and generally less than 40 carbon atoms. The commonest examples include the detergent-forming acids, i. e., those acids which combine with alkalies to produce soap or soap-like bodies. The detergent-forming acids, in turn include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralykyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetylricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic, aliphatic and fatty acids, such as dihydroxystearic acid, dihydroxy palmitic acid, dihydroxybehenic acid, alphahydroxy capric acid, alphahydroxystearic acid, alphahydroxy palmitic acid, alphahydroxylauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin and carnauba wax. Such acids include carnaubic acid, coerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy diphenyl, naphthetic and abietic acid; aralkyl and aromatic acids, such as benzoic acid, Twitchell fatty acids, naphthoic acids, carboxydiphenyl pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

Having obtained the azolidine of the kind described, one proceeds to acylate same with a high molal carboxy acid, and more particularly, with a detergent-forming acid. The most desirable type of detergent-forming acid is a fatty acid, and it is preferable to use a hydroxy fatty acid for acylation, particularly ricinoleic acid. The reaction is comparable to the acylation of diethanolamine or the acylation of triethanolamine or dioctylamine. It has been previously pointed out that the reactive hydrogen atom present which is replaced by an acyl radical may be attached to oxygen and is part of a hydroxy hydrocarbon radical, or may be an amino hydrogen atom or both types may be present. Thus, one may obtain an amide type acylation product, an ester type acylation product, or an amido-ester type acylation product. The conventional conditions of acylation are used, to wit, a temperature above the boiling point of water, preferably about 120–140° C. and below the decomposition point of the particular azolidine. A temperature of 165–195° or even in excess of 200° may be employed. Generally speaking, the acidic body used for acylation and the azolidine will combine to form a soap or salt which represents a uniform or homogeneous mixture. On heating at the higher temperature indicated, acylation takes place. Water which is formed may be eliminated in any suitable manner, such as by passing through a dry gas, as nitrogen; or the reaction may be conducted in presence of a high boiling solvent, such as xylene, which distills off during the course of reaction, and carries away the water formed. Any suitable period of time may be taken for reaction, such as one to eight or 10 hours. As is evident from what has been said, one may introduce more than one acyl radical if there is more than one reactive hydrogen atom present. Instead of the acid itself, the obvious functional equivalents of the kind previously indicated may be used.

As examples of preparation of my preferred reagents, the following are noted:

*Example 1*

An azolidine of the following composition:

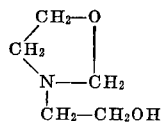

obtained in the manner indicated or in any suitable manner, is acylated with one mole of ricinoleic acid so as to form the corresponding ester. The ricinoleyl radical simply replaces the hydrogen atom of the hydroxyl group.

*Example 2*

An azolidine of the following formula:

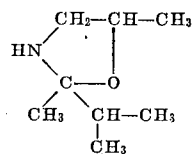

is converted into an amide by reaction with one mole of ricinoleic acid.

*Example 3*

An azolidine of the following composition:

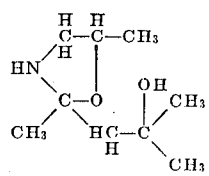

is acylated with two moles of ricinoleic acid.

*Example 4*

Oleic acid is substituted for ricinoleic acid in Examples 1–3 preceding.

*Example 5*

Purified naphthenic acid derived from Gulf Coast Crude oil is substituted for ricinoleic acid in Examples 1–3 preceding.

It is to be noted that some of the compounds described are basic in character due to the presence of an unacylated basic amino nitrogen atom, or due to the presence of an esterified group of the kind described. In such instances the compound may be employed as such, or may be employed in basic form (i. e., after combination with water) or may be employed in salt form by reaction with an acid such as acetic acid, lactic acid, hydrochloric acid, or any other suitable acid.

Conventional demulsifying agents employed in the treatment of oil field emulsions are used as such, or after dilution with any suitable solvent, such as water-petroleum hydrocarbons, such as gasoline, kerosene, stove oil, a coal tar product, such as benzene, toluene, xylene, tar acid oil, cresol anthracene oil, etc. Alcohols, particularly aliphatic alcohols, such as methyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ration of 1 to 10,000 or 1 to 20,000 or even 1 to 30,000, such apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practicing my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well or at some point prior to the emergence of said well fluids. This particular type of application is decidedly feasible when the demulsifier is used in connection with acidification of calcareous oil bearing strata, especially if suspended in or dissolved in the acid employed for acidification.

Having thus described my invention, what I claim as new and desire to secure by Letters Patent is:

1. A process for breaking petroleum emulsions of the water-in-oil type, characterized by subjecting the emulsion to the action of a demulsifier comprising an acylated azolidine, characterized by the fact that at least one acyl radical is obtained from a high molecular weight carboxy acid.

2. A process for breaking petroleum emulsions of the water-in-oil type, characterized by subjecting the emulsion to the action of a demulsifier comprising an acylated azolidine, characterized by the fact that at least one acyl radical is obtained from a detergent-forming carboxy acid.

3. A process for breaking petroleum emulsions of the water-in-oil type, characterized by subjecting the emulsion to the action of a demulsifier comprising an acylated azolidine, characterized by the fact that at least one acyl radical is obtained from a higher fatty acid having more than 8 and not over 22 carbon atoms.

4. A process for breaking petroleum emulsions of the water-in-oil type, characterized by subjecting the emulsions to the action of a demulsifier comprising an acylated azolidine, characterized by the fact that at least one acyl radical is obtained from a hydroxylated higher fatty acid having more than 8 and not over 22 carbon atoms.

5. A process for breaking petroleum emulsions of the water-in-oil type, characterized by subjecting the emulsion to the action of a demulsifier comprising an acylated azolidine, characterized by the fact that at least one acyl radical is obtained from ricinoleic acid.

6. A process for breaking petroleum emulsions of the water-in-oil type, characterized by subjecting the emulsion to the action of a demulsifier comprising an acylated azolidine, characterized by the presence of a single ricinoleyl radical.

MELVIN DE GROOTE.